United States Patent
Takada et al.

[11] Patent Number: 5,309,791
[45] Date of Patent: May 10, 1994

[54] CONTROL SYSTEM FOR BOTH ENGINE AND AUTOMATIC TRANSMISSION

[75] Inventors: Mitsuru Takada, Aichi; Jun Harada, Toyota, both of Japan

[73] Assignee: Toyota Jidosha Kabushiki Kaisha, Toyota, Japan

[21] Appl. No.: 988,806

[22] Filed: Dec. 10, 1992

[30] Foreign Application Priority Data

Dec. 11, 1991 [JP] Japan .................. 3-350791
Dec. 29, 1991 [JP] Japan .................. 3-359006

[51] Int. Cl.$^5$ .............................. F16H 59/00
[52] U.S. Cl. ............................... 74/858
[58] Field of Search ................. 74/858, 844

[56] References Cited

U.S. PATENT DOCUMENTS

| | | |
|---|---|---|
| 3,789,702 | 2/1974 | Price . |
| 4,403,527 | 9/1983 | Mohl et al. ............ 74/858 |
| 5,036,728 | 8/1991 | Kawasoe et al. . |
| 5,072,630 | 12/1991 | Kikuchi et al. ......... 74/858 |
| 5,129,286 | 7/1992 | Nitz et al. ............. 74/858 |
| 5,178,041 | 1/1993 | Takada ................. 74/857 |
| 5,188,005 | 2/1993 | Sankpal et al. ...... 74/858 X |
| 5,201,250 | 4/1993 | Kato et al. ............. 74/858 |

FOREIGN PATENT DOCUMENTS

| | | |
|---|---|---|
| 0041238 | 12/1981 | European Pat. Off. . |
| 0257844 | 3/1988 | European Pat. Off. . |
| 0467605 | 1/1992 | European Pat. Off. . |
| 4023971 | 2/1991 | Fed. Rep. of Germany . |
| 62-216840 | 9/1987 | Japan . |
| 3-5248 | 1/1991 | Japan . |
| 3-74225 | 3/1991 | Japan . |

OTHER PUBLICATIONS

Patent Abstracts of Japan, vol. 015, No. 164 (M-1106), Apr. 24, 1991, JP-A-3031558, Feb. 12, 1991.

*Primary Examiner*—Dirk Wright
*Attorney, Agent, or Firm*—Oblon, Spivak, McClelland, Maier & Neustadt

[57] ABSTRACT

A control system for controlling both an engine capable of selecting a plurality of output characteristics having different output torques for a throttle opening and dropping a selected output torque temporarily, and an automatic transmission connected to the engine. The control system comprises: a first decider for deciding it on the basis of data inputted that the output characteristics of the engine should be changed; a second decider for deciding it on the basis of input data including a vehicle speed and a throttle opening that a gear change should be performed; and a third decider for deciding, when the second decider decides the performance, the torque-down to be temporarily effected, to a value according to the output characteristics of the engine.

8 Claims, 11 Drawing Sheets

CONTROL SYSTEM FOR BOTH ENGINE AND AUTOMATIC TRANSMISSION

BACKGROUND OF THE INVENTION

1. Field of the Invention

The present invention relates to a system for controlling both an engine enabled to control output characteristics and temporary torque-down by changing an air/fuel ratio or the like and an automatic transmission connected to the engine.

2. Description of the Prior Art

In recent years, improvements in mileage of vehicles have been required from the points of preservation of the environment and problems in energy. For these improvements, there has been developed a lean combustion engine capable of running at a higher air/fuel ratio or an engine having its exhaust gases partially returned to the intake passage.

The lean combustion engine is constructed, as described in Magazine "Automobile Technology" Vol. 38, No. 9, such that an improvement in mileage under a light load and a high output under a heavy load can be made compatible by keeping the air/fuel ratio at a high level in a state having a predetermined throttle opening or less (i.e., under a light load). In case of running the lean combustion engine at a high air/fuel ratio, the combustion is stabilized by establishing intense swirls in the cylinder. In order to improve the combustion efficiency, moreover, a swirl control valve is provided, or the intake port is modified to have a special shape.

FIG. 17 is a diagram plotting the relations between the output torque and the throttle opening of an engine which executes the lean combustion in accordance with the throttle opening. Thick, solid curves appearing in FIG. 17 indicate the practical engine torques. Incidentally, curve ① in FIG. 17 plots a torque characteristic at the time of a lean combustion, in which the air/fuel ratio is about "21". In this state, the a swirl control valve is closed. On the other hand, curve ② or ③ plots a torque characteristic at the time of a rather lean combustion, in which the air/fuel ratio is about "17" or "16". Moreover, curve ④ plots a torque characteristic at the time of a stoichiometric combustion, in which the air/fuel ratio is at "14.5". In addition, curve ⑤ plots a torque characteristic at the time of an power combustion, in which the air/fuel ratio is at about "12.5".

In the aforementioned lean combustion engine, as shown in FIG. 17, for a throttle opening $T_A$ lower than a value $T_{A1}$ of FIG. 17, the air/fuel ratio is set to about "21" to effect the lean combustion. On the other hand, in the state having the throttle opening $T_A$ between the values $T_{A1}$ and $T_{A2}$ of FIG. 17 (i.e., $T_{A1} \leq T_A < T_{A2}$), the air/fuel ratio is gradually changed to about "17 to 16" to increase the engine torque continuously. When the throttle opening $T_A$ exceeds the value $T_{A2}$, the air/fuel ratio is decreased to a power value simultaneously as the aforementioned swirl control valve is opened, to retain the torque in the large throttle opening range. In the combustion state having the swirl control valve opened, however, the engine torque discontinuously changes, as indicated between $T_1$ and $T_2$ in FIG. 17, with the change in the air/fuel ratio.

In the lean combustion engine described above, the output torque discontinuously changes with the change in the air/fuel ratio. This situation is also experienced by the engine of the type in which the exhaust gases are partially recirculated to the intake passage. In the automatic transmission connected to the engine of this kind, the torque to be applied to a frictional engagement unit seriously fluctuates before and after the output torque of the engine discontinuously changes. Thus, the durability of the frictional engagement unit is maintained, and the shift shocks are reduced by performing controls to change the servo oil pressure of the frictional engagement unit highly or to reduce the output torque of the engine at a shifting time.

The setting of a high air/fuel ratio and the much recirculation of engine exhaust gases will lead to a drop in the output torque of the engine. With a large throttle opening, however, a high torque is demanded, and for this demand, it is necessary to decrease the air/fuel ratio and to interrupt the much recirculation of exhaust gases. These controls are executed not only in case a high torque is demanded but also in case an engine water temperature is low. Specifically, the combustion in the cylinder in case of a low engine water temperature is not so smooth as that in case of a high water temperature. Thus, the air/fuel ratio is decreased to facilitate the combustion even with a small throttle opening. As a result, the engine output characteristics in case of a small throttle opening are at least two kinds: those in the state of a high engine water temperature and those in the state of a low water temperature. In the prior art, however, the shifting oil pressure of the automatic transmission at a shifting time is uniquely set according to the throttle opening. In case the engine output characteristics change into a plurality of kinds, as described above, any of them is mismatched by the shifting oil pressure of the automatic transmission. As a result, the automatic transmission may fail to have its shifting characteristics optimized.

On the other hand, let the case be considered, in which the aforementioned engine having a changing air/fuel ratio, e.g., the lean combustion engine is to be controlled. If the air/fuel ratio is changed from the stoichiometric to lean ranges as the engine water temperature rises, the engine has its output characteristics accordingly changed. If a shift occurs simultaneously with the change in the output characteristics, it obliges a control to drop the engine torque. On the other hand, if the air/fuel ratio is changed from the lean to stoichiometric ranges in case the throttle opening abruptly increases while the vehicle is running in a lean combustion state, a control is executed to drop the engine torque for a shift in accordance with the change in the throttle opening. In an EGR engine and an automatic transmission connected to this engine, on the other hand, the control of dropping the engine torque is also executed as in the lean combustion engine, if a shift occurs when the recirculation rate of exhaust gases is to be changed. Thus, the change in the engine output characteristics, the shift in the automatic transmission, and the drop of the engine torque accompanying the shift have to be premised to occur simultaneously. It is, however, difficult to time those three controls properly due to unavoidable delays in responses in the individual controls or other causes. As a result, the shift shocks may become serious, or the frictional engagement unit may excessively slip to have its durability deteriorated.

SUMMARY OF THE INVENTION

A main object of the present invention is to prevent any deterioration of shift shocks which are caused by an automatic transmission connected to an engine capable of having its output characteristics changed.

Another object of the present invention is to prevent any drop of the durability of the frictional engagement means of an automatic transmission.

Still another object of the present invention is to provide a control system for synthetically controlling the change in the output characteristics of the engine, the torque-down at a shifting time, and the gear change in the automatic transmission.

In the control system according to the present invention: first decide means decides it on the basis of input data that the output characteristics of an engine should be changed; second decide means decides it on the basis of input data including a vehicle speed and a throttle opening that a gear change should be executed in an automatic transmission; and third decide means decides a torque-down at a shifting time to a value according to the output characteristics of the engine.

In a running operation in either high or low output characteristics, therefore, the torque to be inputted at a shifting time to the automatic transmission is suppressed to a low level so that neither the shift shocks are deteriorated nor are caused an excessive slippage of the frictional engagement unit and accordingly the drop of durability of the same.

In the control system according to the present invention, moreover, the output characteristics of the engine are controlled to higher ones, if the engine water temperature is low, and to lower ones if the same temperature is high. And the torque-down at a shifting time is set to a higher level in higher output characteristics than in lower output characteristics.

In the control system according to the present invention, still moreover, any change in the output characteristics is inhibited if the following three items are simultaneously decided: that the engine output characteristics should be changed; that the gear change in the automatic transmission should be effected; and that the torque-down should be effected in accordance with the gear change. Thus, the controls of the gear change and the torque-down are executed while the output characteristics being retained as those in the prior art, so that the torque to be inputted to the automatic transmission is neither excessive nor fluctuated during the gear change. As a result, it is possible to prevent the deterioration of the shift shocks and the drop of the durability of the frictional engagement unit.

The above and further objects and novel features of the present invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

Figure 1:
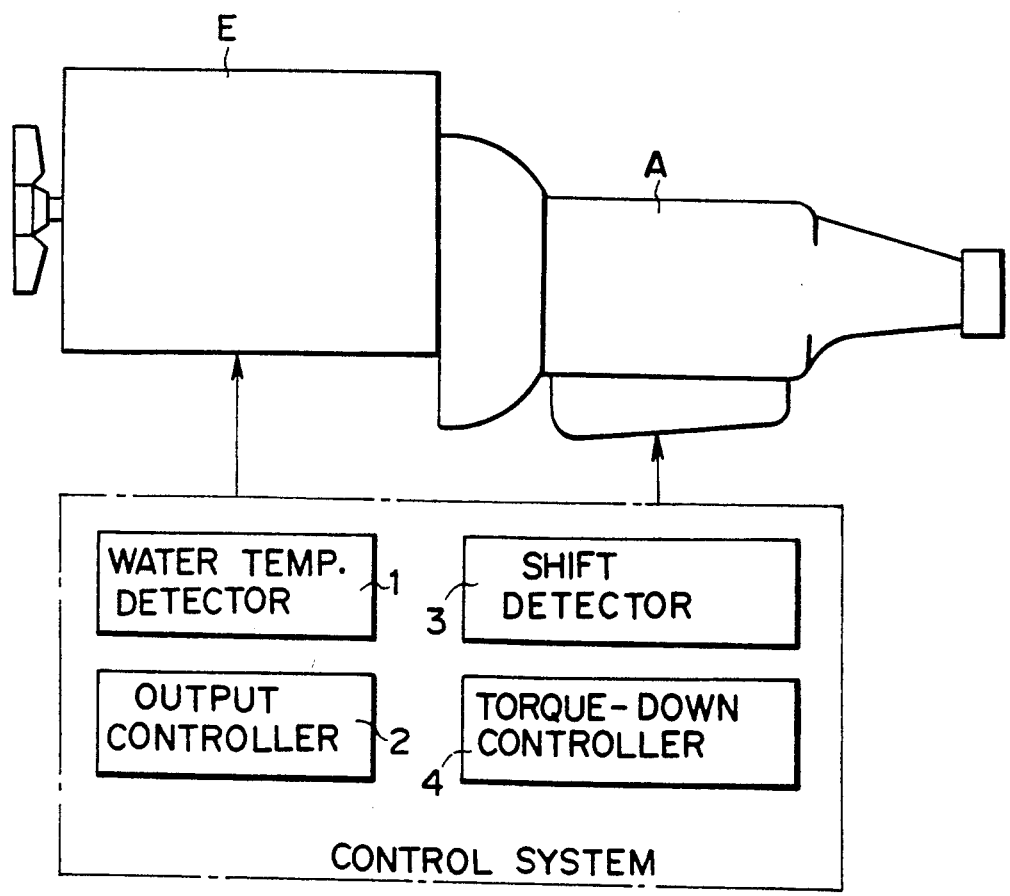
FIG. 1 is a block diagram showing a fundamental construction of one embodiment of the present invention.

FIG. 1 shows a fundamental construction showing one embodiment of a control system according to the present invention. The control system, as designated at letter C, is used to control both an engine E capable of having its output characteristics controlled and its torque-down controlled at a shifting time, and an automatic transmission A connected to the engine E. The control system C is equipped with: engine water temperature detect means 1 for detecting the water temperature of the engine E; output characteristic control means 2 for changing the output characteristics of the engine E according to the engine water temperature detected; shift detect means 3 for detecting a gear change of the automatic transmission A; and torque-down control means 4 for controlling a torque-down at a detected shifting time in accordance with the output characteristics based upon the engine water temperature.

In the control system C thus constructed, when the engine water temperature detect means 1 detects the temperature of the cooling water of the engine E, the output characteristic control means 2 changes the output characteristics of the engine E in accordance with the detected result. For example, the air/fuel ratio is decreased the closer to the stoichiometric value to effect high output characteristics for the lower engine water temperature. In this meantime, the shift detect means 3 detects a gear change in the automatic transmission A, and the torque-down control of the engine E is effected at the detected shifting time. This torque-down per se is controlled by the torque-down control means 4 in accordance with the output characteristics based upon the aforementioned engine water temperature. In case of high output characteristics, for example, the torque-down at the shifting time is increased to decrease the torque to be inputted to the automatic transmission A. Even if the regulation level of the oil pressure in the automatic transmission A is set suitable for a low output characteristic state such as a lean combustion state or a state in which the recirculation of the exhaust gases is increased, neither the shift shocks are deteriorated nor is an excessive slippage of the frictional engagement unit.

Figure 2:
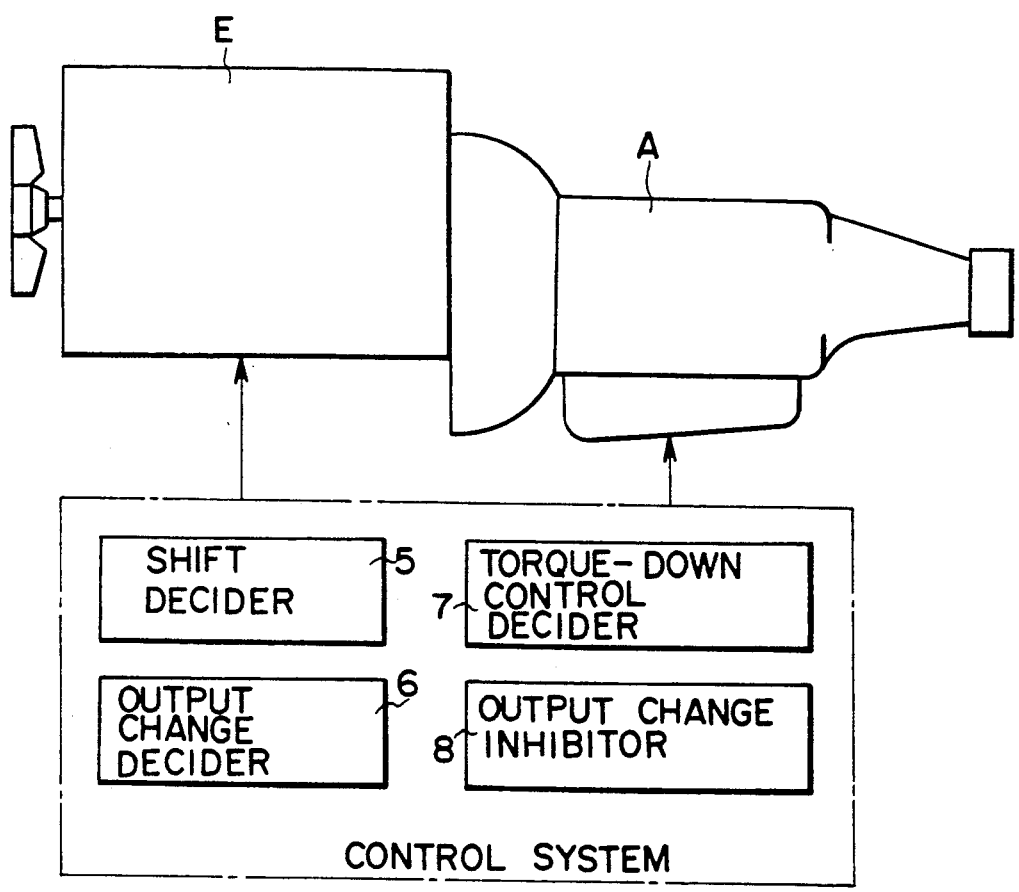
FIG. 2 is a block diagram showing a fundamental construction of another embodiment.

FIG. 2 shows a fundamental construction of another embodiment of the control system C according to the present invention. This control system C controls both an engine E capable of selecting a plurality of output characteristics for an identical throttle opening and controlling a torque-down at a shifting time in accordance with the output characteristics, and an automatic transmission A connected to the engine E. The control system C is equipped with: shift decide means 5 for deciding that a gear change should be effected in the automatic transmission A; output characteristic change decide means 6 for deciding that the output characteristics of the engine E are should be changed; torque-down control execution decide means 7 for deciding that the torque-down control of the engine E according to the gear change in the automatic transmission A should be effected; and output characteristic change inhibit means 8 for inhibiting the change in the aforementioned output characteristics if the shift decide means 5 decides that the gear change should be effected, if the output characteristic change decide means 6 decides that the output characteristics of the engine E should be changed, and if the torque-down control execution decide means 7 decides that the engine torque should be decreased.

In the engine E intended by the present invention, the air/fuel ratio and the exhaust gas recirculation are changed to change the output characteristics for an identical throttle opening in accordance with the running state such as the engine water temperature or the changing rate of the throttle opening. In the automatic transmission A, on the other hand, the gear change is executed on the basis of the running state such as the engine load or the throttle opening. In the control system C of the present invention, therefore, the output characteristic change decide means 6 decides the change in the output characteristics in the engine E whereas the shift decide means 5 decides the gear change in the automatic transmission A. If, moreover, the output characteristics of the engine E, when the shift is decided are high, the engine torque is dropped in accordance with the shift. In this case, therefore, the engine torque-down control execution decide means 7 decides that the engine torque-down control should be executed according to the gear change. Moreover, if the shift decide means 5 decides the gear change in the automatic transmission A so that the engine torque-down control execution decide means 7 decides that the torque-down control of the engine E should be executed, and if the output characteristic change decide means 6 accordingly decides that the output characteristics of the engine E should be changed, the output characteristic change inhibit means 8 inhibits any change of the output characteristics of the engine E. As a result, the gear change in the automatic transmission A and the torque-down control of the engine E for the gear change are executed with the output characteristics of the engine E being stably kept in those just before so that neither excess nor deficiency is caused in the oil pressure for engaging the frictional engagement unit in the automatic transmission A. As a result, the shift shocks are improved together with the durability of the frictional engagement unit.

Figure 3:
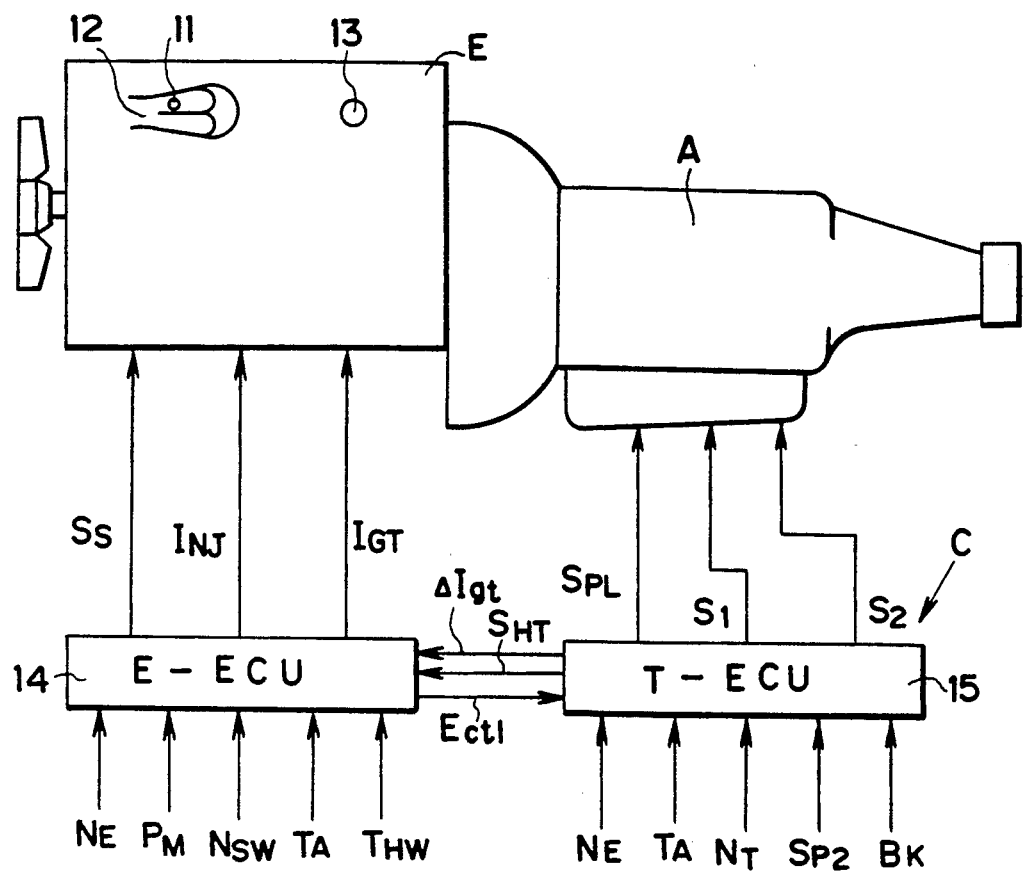
FIG. 3 is a block diagram showing still another embodiment more specifically.

FIG. 3 shows a more specific embodiment. The engine E intended by the present invention can effect a lean combustion at a high air/fuel ratio and a stoichiometric combustion at a lower air/fuel ratio or a combustion at a power air/fuel ratio. For smoothing these combustion, an intake passage 12 is equipped therein with a control valve 11. This control valve 11 is specifically exemplified by a swirl control valve for establishing intense swirls in the engine cylinder when it is closed. On the other hand, the aforementioned engine E is equipped in addition to the throttle valve with an output torque control mechanism 13 acting as electric means for controlling the output torque. This output torque control means 13 is exemplified by an ignition delay angle control mechanism for changing an ignition timing in response to an electric instruction signal.

On the other hand, the automatic transmission A intended by the present invention is connected to the aforementioned engine E and is constructed such that the shift control is effected exclusively by the oil pressure or such that the shift is effected by detecting the vehicle speed, the throttle opening and so on electrically and by controlling the oil pressure in response to the electric instruction signal based upon the detected result.

Specifically, the aforementioned control system C for controlling the engine E and the automatic transmission A is constructed mainly of a microcomputer, which is composed, for example, of an engine electronic control unit (E-ECU) 14 and an automatic transmission electronic control unit (T-ECU) 15, as shown in FIG. 3. Moreover, the E-ECU 14 is fed with signals including an engine revolution number signal $N_E$, an intake manifold vacuum signal $P_M$, a neutral switch signal $N_{SW}$, a throttle opening signal $T_A$ and an engine water temperature signal $T_{HW}$ to output signals including a control signal $S_S$ for the aforementioned control valve (i.e., the swirl control valve) 11, a fuel injection signal $I_{NJ}$ and an igniter signal $I_{GT}$.

On the other hand, the T-ECU 15 for controlling the automatic transmission A is fed with signals including a vehicle speed signal $S_{P2}$, the engine revolution number signal $N_E$, a turbine revolution number signal $N_T$, the throttle opening signal $T_A$, and a brake signal $B_K$ to output signals including a line pressure controlling solenoid valve signal $S_{PL}$ and shifting solenoid valve signals $S_1$ and $S_2$. Moreover, a stoichiometry decide signal $E_{ctl}$ is outputted from the E-ECU 14 to the T-ECU 15 whereas an ignition timing delay angle signal $\Delta I_{gt}$ and a shift execute signal $S_{HT}$ are outputted from the T-ECU 15 to the E-ECU 14.

Figure 4:
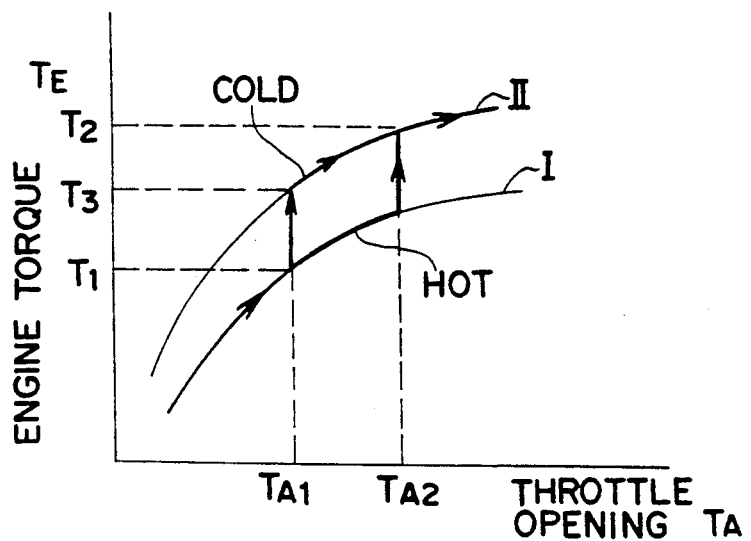
FIG. 4 is a diagram showing one example of the output characteristics of a lean combustion engine.

Here will be described the operations of the system thus constructed. In a lean combustion engine, the air/fuel ratio is controlled on the basis of the throttle opening, as schematically shown in FIG. 4. In a state having the throttle opening $T_{A1}$, a lean combustion at a large air/fuel ratio is effected so that the engine torque $T_E$ changes along a characteristic curve I and takes a value $T_1$. In case, on the other hand, the throttle opening is increased to the value $T_{A2}$ ($>T_{A1}$), the air/fuel ratio is decreased to the stoichiometric value, for example, for achieving a sufficient output, so that the engine torque $T_E$ changes along a characteristic curve 11. In these ways, the air/fuel ratio is basically changed to the lean range and the stoichiometric value in accordance with the throttle opening. If the engine water temperature is low, however, the engine torque $T_E$ takes a torque $T_3$ on the characteristic curve 11 even if the throttle opening takes the value $T_{A1}$.

Figure 5A:
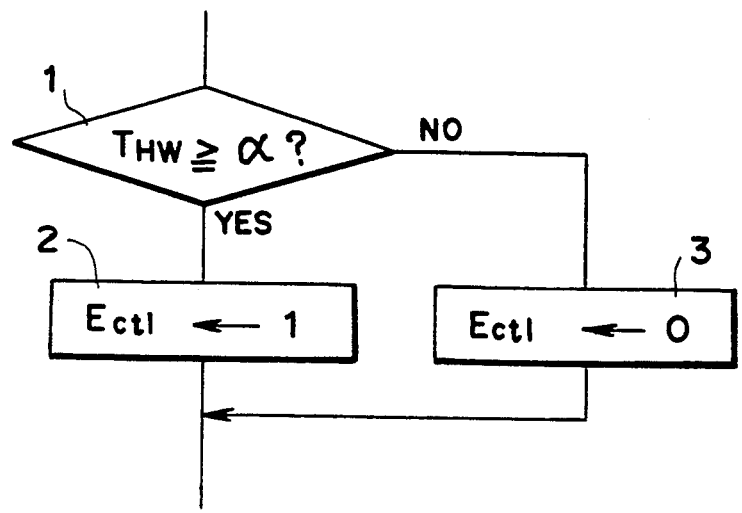
FIGS. 5A and 5B are flow charts showing one example of a control for dropping an engine torque at a shifting time.
Figure 5B:
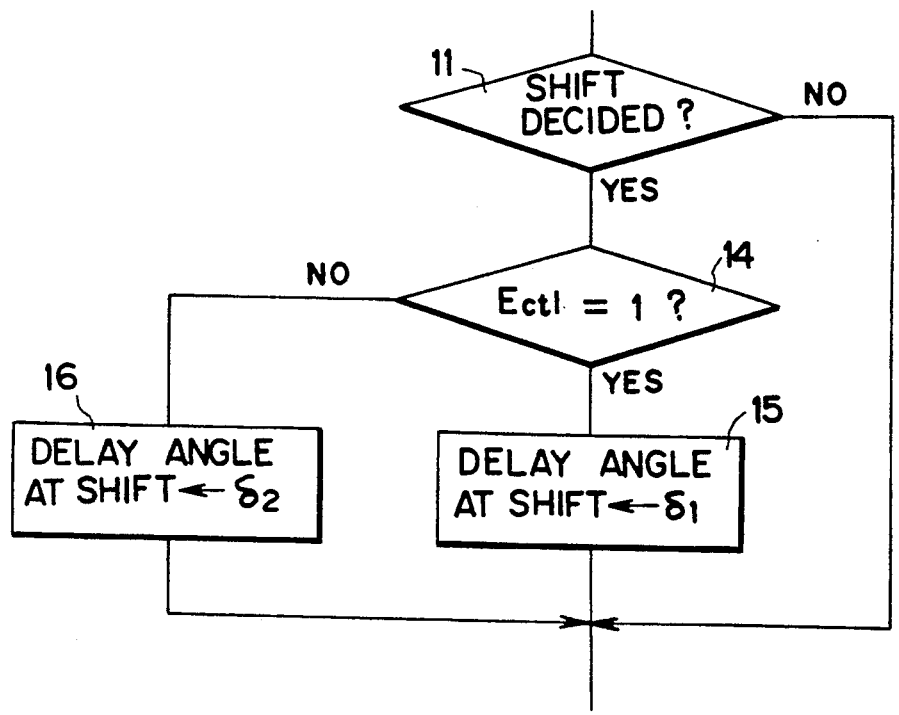

In the system thus far described, therefore, it is decided (at Step 1), as shown in the flow chart of FIG. 5A, whether or not the engine water temperature $T_{HW}$ detected exceeds a predetermined reference temperature $\alpha$. If this answer is "YES", the routine advances to Step 2, at which the stoichiometry decide signal $E_{ctl}$ is set to "1". If, on the contrary, the engine water temperature $T_{HW}$ is lower than the reference temperature $\alpha$, that is, if the answer of Step 1 is "NO", the routine advances to Step 3, at which the stoichiometry decide signal $E_{ctl}$ is set to "0". This reference temperature $\alpha$ has a value providing a decision reference for switching the running state of the engine E between the lean combustion and the stoichiometric combustion. Therefore, the lean combustion state is indicated, if the stoichiometry decide signal $E_{ctl}$ is set at "1", whereas the stoichiometric combustion is indicated if the same signal is set at "0". Incidentally, the controls shown in FIG. 5A are executed in the aforementioned E-ECU 14, and the stoichiometry decide signal $E_{ctl}$ is sent to the T-ECU 15. On the other hand, the T-ECU 15 executes the controls shown in FIG. 5B. At first, it is decided at Step 11 whether or not a gear change has been decided. If the answer is "NO", the control routine is skipped out. If the answer is "YES", on the other hand, the routine advances to Step 14, at which it is decided whether or not the received stoichiometry decide signal $E_{ctl}$ is at "1". If this answer is "YES", the result means the lean combustion state, and the routine advances to Step 15, at which a predetermined value $\delta_1$ in accordance with the engine output in the lean combustion state is selected as an ignition timing delay angle at a shift and outputted to the E-ECU 14. If the answer of Step 14 is "NO", on the contrary, it is meant that the running state of the engine E is in the stoichiometric combustion state. Thus, the routine advances to Step 16, at which a predetermined value $\delta_2$ higher than the foregoing value $\delta_1$ is selected as the ignition timing delay angle at the shifting time and is outputted to the E-ECU 14. On the basis of those ignition timing delay angles $\delta_1$ and $\delta_2$, moreover, the E-ECU 14 delays the ignition timing so that the engine torque at the shifting time is decreased according to the delay angles.

Figure 6:
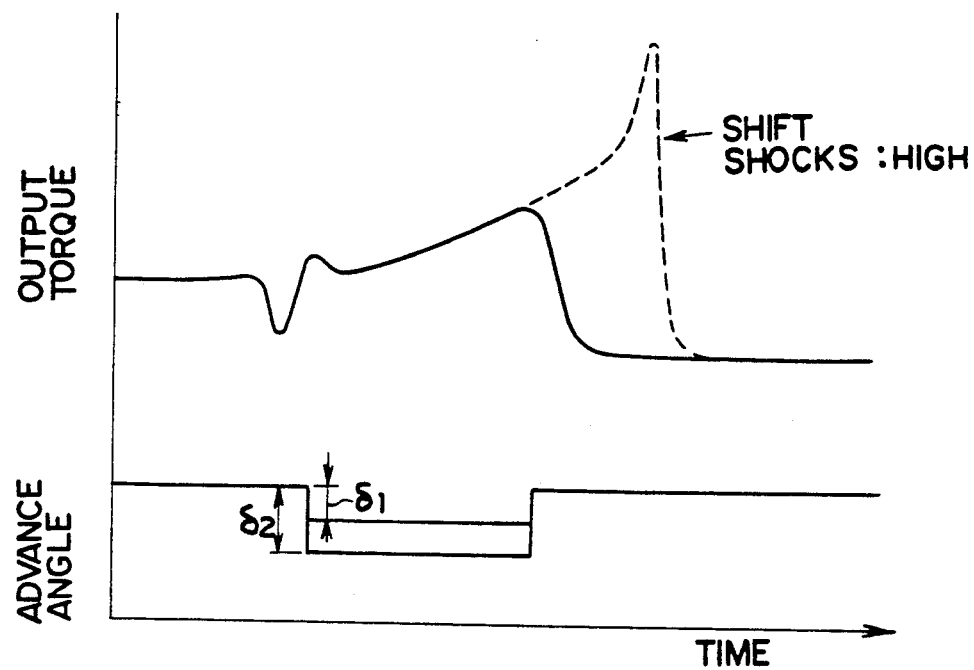
FIG. 6 is a time chart showing a torque-down controls at a shifting time and the changes in output torque according to the present invention together with an example of the prior art.

As a result, in the system thus far described, the torque-down at a shifting time is low, if the output torque is low (according to the case of the output characteristics, as plotted by the characteristic curve I of FIG. 4) because of the lean combustion state, but is high if the output torque is high (according to the case of the output characteristics, as plotted by the characteristic curve 11 of FIG. 4) because of the stoichiometric combustion state. Thus, the practical torque at the shifting time in the stoichiometric combustion state is close to or substantially equal to that at the shifting time in the lean combustion state. As a result, even if the oil pressure in the automatic transmission A is adjusted to one in the frequent state of the lean combustion, the shift shocks at the shifting time in the stoichiometric combustion state of high output characteristics are improved. FIG. 6 schematically shows that state in a diagram form. As shown, the output torques change smoothly, as plotted by solid curves, to improve the shift shocks, respectively, in case the ignition timing delay angle at the shifting time in the lean combustion state is at $\delta_1$ and in case the ignition timing delay angle at the shifting time in the stoichiometric combustion state. In case, on the contrary, the ignition timing delay angle is not controlled on the basis of the change in the output characteristics according to the engine water temperature, that is, in case the ignition timing delay angle is set to a low value because of a small throttle opening which is caused by a low engine water temperature despite the stoichiometric combustion state, the input torque to the automatic transmission grows so high that the gear change is not completed for a predetermined time period. As a result, an accumulator has its piston moved to its limit position thereby to cause the so-called "end hitting", as shown by broken curve in FIG. 6, so that high shift shocks occur.

Figure 7:
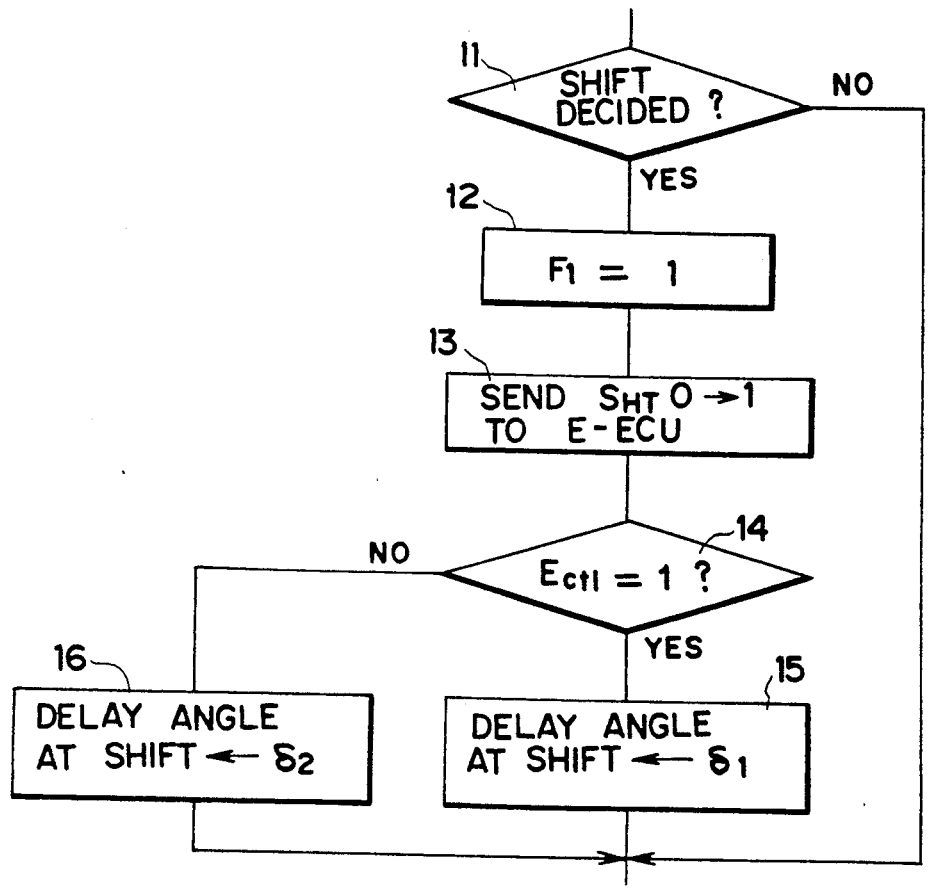
FIG. 7 is a flow chart showing a routine for sending a shift execute signal based on a shift decision to an electronic control unit for an engine and for controlling an ignition timing delay angle at a shifting time in accordance with the output characteristics of the engine.

Here will be described the controls of the case, in which both the decisions of the gear change and the switching of the air/fuel ratio hold. For the controls depending upon whether or not the gear change has been decided, a routine of FIG. 7 is executed in place of the foregoing routine of FIG. 5B. Specifically, it is decided (at Step 11) whether or not the decision of executing a gear change has held. If this answer is "NO", this control routine is skipped out. If "YES", on the other hand, the routine advances to Step 12, at which a flag $F_1$ is set to "1". At Step 13, moreover, the shift execute signal $S_{HT}$ is set to "1" and sent to the E-ECU 14. At Step 14, it is decided whether or not the received stoichiometry decide signal $E_{ctl}$ at "1". This stoichiometry decide signal $E_{ctl}$ is set to "1" or "0" in accordance to the aforementioned routine shown in FIG. 5A. If the answer of Step 14 is "YES", the lean combustion state is meant. Then, the routine advances to Step 15, at which the predetermined value $\delta_1$ set according to the engine output in the lean combustion state is selected as the ignition timing delay angle at the shifting time and is outputted to the E-ECU 14. If the answer of Step 14 is "NO", on the contrary, it is meant that the running state of the engine E is the stoichiometric combustion state. Then, the routine advances to Step 16, at which the predetermined value $\delta_2$ higher than the aforementioned value $\delta_1$ is selected as the ignition timing delay angle at the shifting time and is outputted to the E-ECU 14. At the time of executing the gear change in the automatic transmission A, moreover, this E-ECU 14 delays the ignition timing on the basis of those ignition timing delay angles $\delta_1$ and $\delta_2$ so that the engine torque at the shifting time is decreased according to the delay angle.

Figure 8:
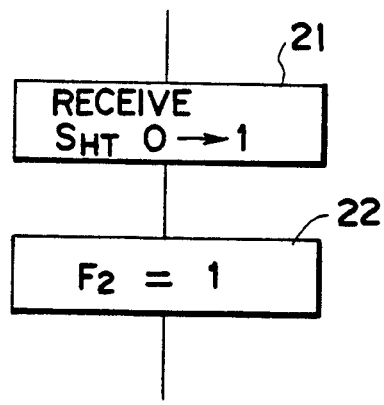
FIG. 8 is a flow chart showing a control routine for setting a flag in response to the shift execute signal.

In this meantime, as shown in FIG. 8, the E-ECU 14 receives (at Step 21) the shift execute signal $S_{HT}$, which is set to "1", to set a flag $F_2$, to "1" (at Step 22).

In case of a decision of switching the air/fuel ratio (at Step 31 of FIG. 9) for changing the output characteristics of the engine E in addition to the aforementioned decision of the gear change, it is decided at Step 32 in the E-ECU 14 whether or not the flag $F_2$ is at "1". Since this flag $F_2$ is set to "1" as the automatic transmission A executes the gear change, as described above, the answer of Step 32 in this case is "YES", and the switching of the air/fuel ratio is inhibited at Step 33. At the shifting time, specifically, the switching of the output characteristics of the engine E is inhibited, and the shift control and the accompanying engine torque-down control are executed with the output characteristics being left as the preceding ones.

Figure 10:
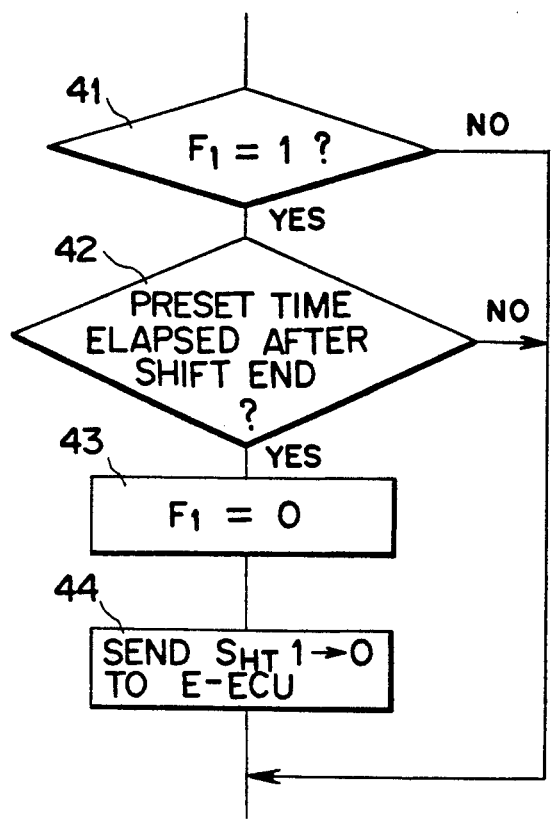
FIG. 10 is a flow chart showing a control routine for deciding the end of the gear change and for sending the shift execute signal to the electronic control unit for an engine.

While the aforementioned controls are being executed, the T-ECU 15 is counting the time. Specifically, it is decided (at Step 41) whether or not the flag $F_1$ is at "1", as shown in FIG. 10. If this answer is "NO" because the gear change is not executed, the control routine is skipped out. If, on the other hand, the answer is "YES" because the gear change is executed, it is decided at Step 42 whether or not a predetermined time period has elapsed after the end of the gear change. If this answer is "NO", the control routine is skipped out to continue the counting of the time. If the answer is "YES", on the other hand, the routine advances to Step 43, at which the flag $F_1$ is set to "0" or cleared out. After this, the shift execute signal $S_{HT}$ is set to "0" and is sent to the E-ECU 14 (at Step 44).

Figure 9:
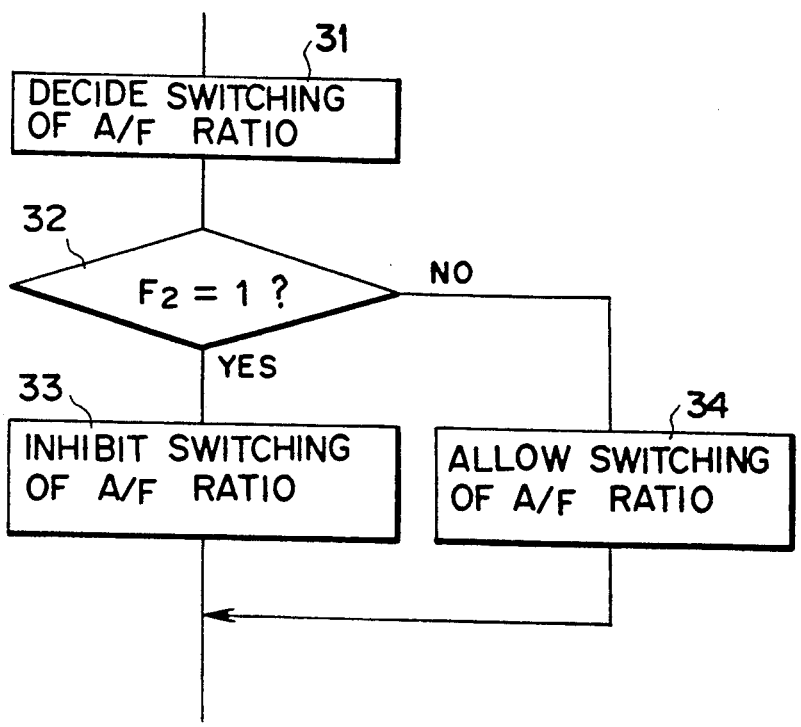
FIG. 9 is a flow chart showing a control routine for inhibiting and allowing a switching of air/fuel ratio on the basis of execution and end of the gear change.
Figure 11:
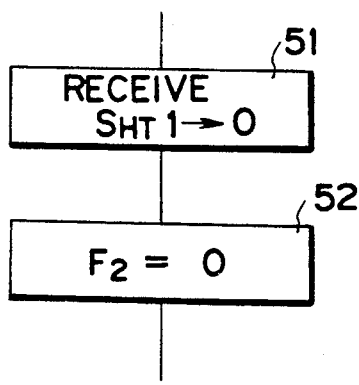
FIG. 11 is a flow chart showing a control routine for clearing the flag in response to the shift end signal.

When the E-ECU 14 receives (at Step 51 of FIG. 11) the shift execute signal $S_{HT}$ set to "0", i.e., the end of the gear change, it sets the flag $F_2$ to "0" or clears out the flag $F_2$ (at Step 52). As a result, the answer of Step 32 of the control routine, as shown in FIG. 9, is "NO". As a result, the switching of the air/fuel ratio is allowed (at Step 34) if the switching of the air/fuel ratio is decided.

Specifically, in case of a shift decision, the control system C thus far described executes the gear change together with the torque-down control of the engine E according to the engine output characteristics. In case the switching of the output characteristics of the engine E is decided simultaneously with the shift decision, it is inhibited until the end of the gear change. Thus, the gear change is executed under the output characteristics of the engine E on and before the shift decision. As a result, there arises no cause for inviting any mismatch between the input torque and the engaging oil pressure in the automatic transmission A so that the gear change can be effected with the improved shift shocks.

Incidentally, one of the decisions of the switching the air/fuel ratio, as at Step 31 of FIG. 9, is exemplified by Step 1 of FIG. 5A, at which it is decided whether or not the cooling water temperature is equal to or higher than the value $\alpha$.

Figure 12:
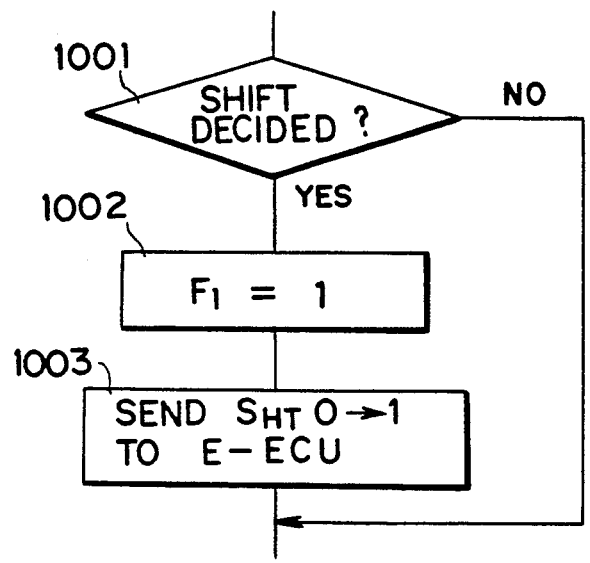
FIG. 12 is a flow chart showing a control routine for sending the shift execute signal based on a gear change decision to the electronic control unit for an engine.

FIGS. 12 to 16 show other control examples by the system of the present invention. FIG. 12 is a flow chart to be executed by the T-ECU 15. At Step 1001, it is decided from the present gear stage and the present load and vehicle speed whether or not a gear change should be executed (namely, the presence or absence of the shift decision). This Step will not be described in detail because it is well known in the art.

If it is decided at Step 1001 that there is no shift decision, the routine is skipped out as it is. If the shift decision is decided at Step 1001, on the other hand, the routine advances to Step 1002, at which a flag $F_1$ indicating that the gear change is being effected is set to "1". After this, the routine advances to Step 1003, at which the shift execute signal $S_{HT}$ is changed from "0" to "1" and sent to the E-ECU 14.

Figure 13:
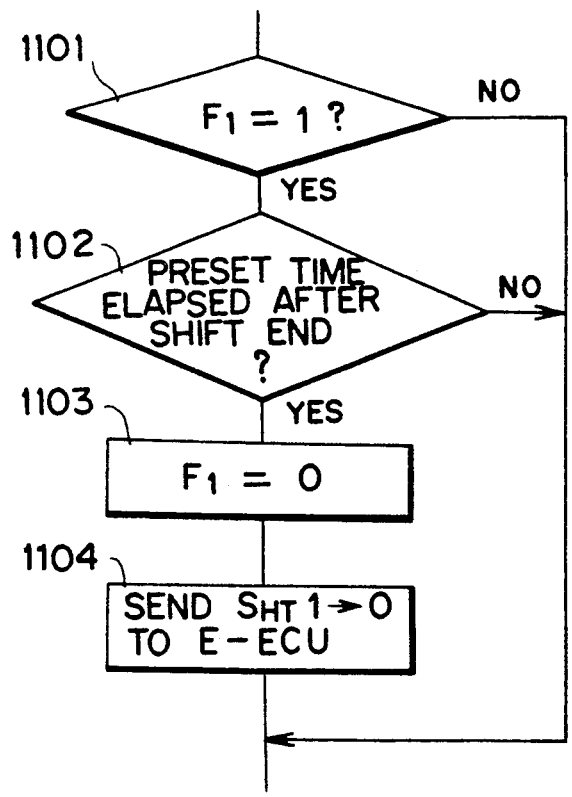
FIG. 13 is a flow chart showing a control routine for deciding the end of the gear change and for sending the shift execute signal to the electronic control unit for an engine.

FIG. 13 is absolutely similar to FIG. 10 but shows a routine to be executed in the T-ECU 15. At first, it is decided at Step 1101 whether the flag $F_1$ indicating that the gear change is being executed is at "1" or "0". If at "0", the present routine is ended as it is. If the flag $F_1$ is at "1", the routine advances to Step 1102, at which it is decided whether or not a predetermined time period has elapsed after the end of the gear change. This decision can be exemplified by various methods including: ① a method, in which the count-up of a timer is started, after the flag $F_1$ has been changed at first at Step 1002 of FIG. 12 from "0" to "1", to decide whether or not the counted value of the timer exceeds a predetermined value; and ② a method, in which the end of a gear change is decided from either the oil pressures of the individual portions participating in the gear change in the automatic transmission A or the positions of the frictional engagement members.

Incidentally, the routine may advance to Step 1103 simultaneously with the end of the gear change. In the present example, however, the routine advances to Step 1103 a predetermined time after the end of the gear change, while considering the various transient disturbances just after the gear change or the dispersion of time required for the gear change.

At Step 1103, the aforementioned flag $F_1$ is returned to "0". At Step 1104, the shift execute signal $S_{HT}$ is changed from "1" to "0" and sent to the E-ECU 14 so as to inform the E-ECU 14 of the fact that the flag $F_1$ has been reset to "0".

Figure 14:
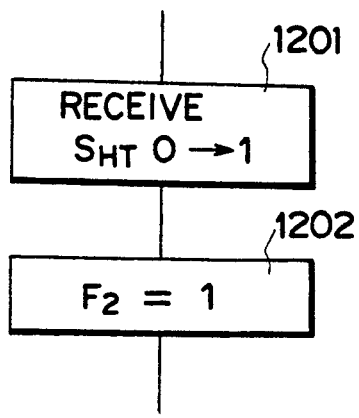
FIG. 14 is a flow chart showing a control routine for setting the flag in response to the shift end signal.
Figure 16:
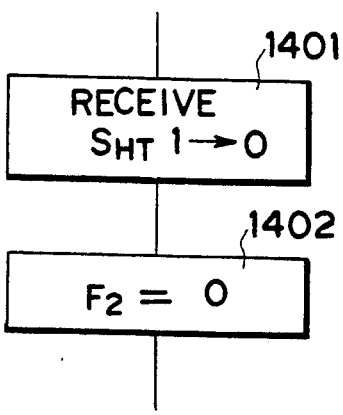
FIG. 16 is a flow chart showing a control routine for clearing the flag in response to the shift end signal.

FIG. 14 shows a routine to be executed in the E-ECU 14. If it is received from T-ECU 15 that the shift execute signal $S_{HT}$ has been changed from "0" to "1", a flag $F_2$ indicating that the automatic transmission A is changing its gears is set to "1". Moreover, the routine of FIG. 16 is executed in the E-ECU 14. If it is received (at Step 1401) that the shift execute signal $S_{HT}$ has been changed from "1" to "0", the flag $F_2$ is set to "0" at Step 1402.

Figure 15:
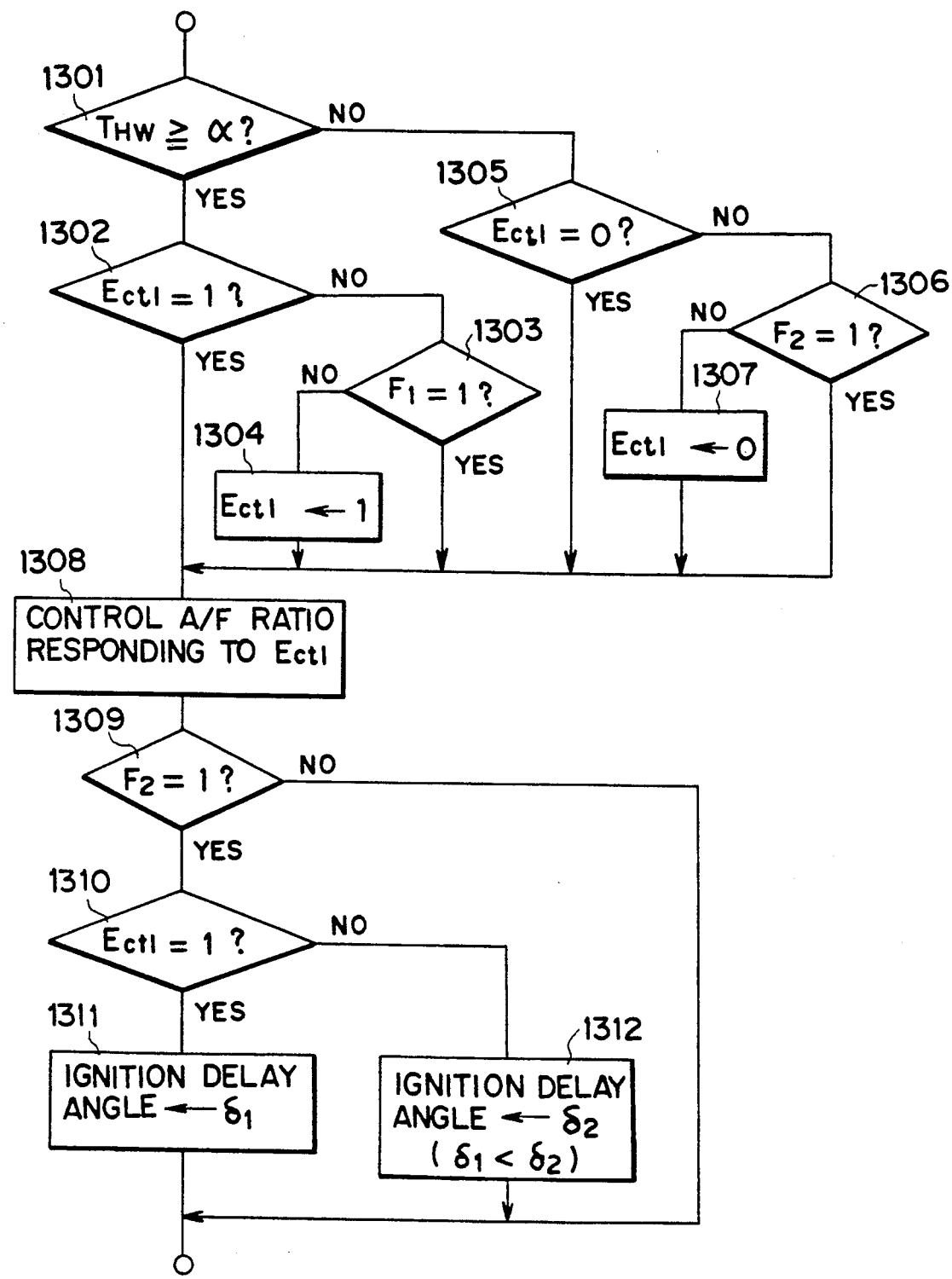
FIG. 15 is a flow chart showing a control routine mainly for switching the output characteristics of the engine and for dropping the engine torque during a gear change.
Figure 17:
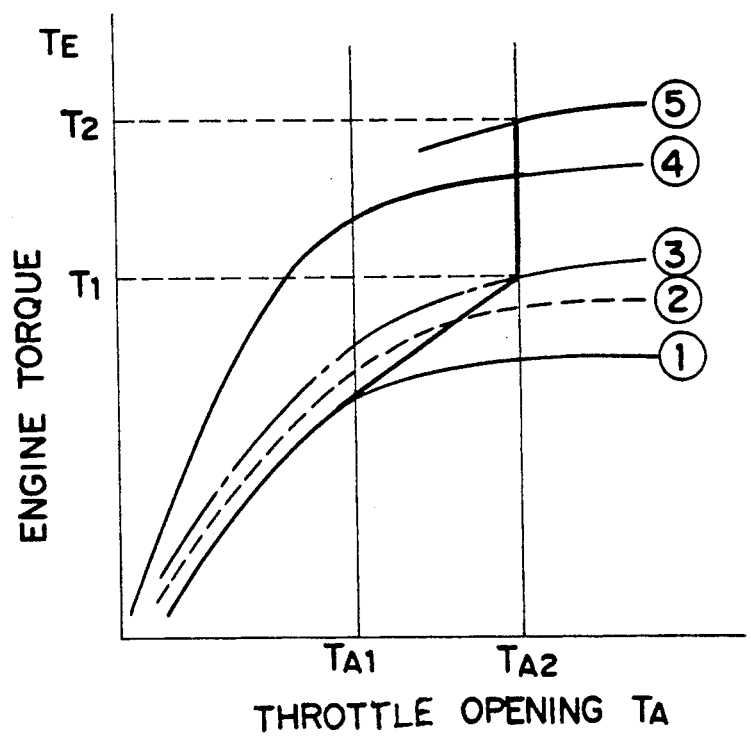
FIG. 17 is a diagram schematically showing the general output characteristics of the lean combustion engine.

FIG. 15 shows a routine for switching the output characteristics of the engine and for executing the engine torque-down during the shifting and so on. This routine is executed in the E-ECU 14. Incidentally, in this example, if the engine cooling water temperature $T_{HW}$ exceeds the predetermined level $\alpha$, the output characteristics of the engine are switched by running the engine in the lean combustion (having a higher air/fuel ratio than that of the stoichiometric ratio). For the identical throttle opening and engine revolution number, therefore, the engine generates different torques depending upon whether it is run in the lean combustion or in the stoichiometric combustion.

In addition to that air/fuel ratio switching condition (i.e., whether or not the cooling water temperature $T_{HW}$ exceeds the predetermined value $\alpha$), there exist a variety of conditions for switching the air/fuel ratio for the identical throttle opening.

At first Step 1301, it is decided whether or not the cooling water temperature $T_{HW}$ exceeds the predetermined value $\alpha$. The routine advances to 1302, if the cooling water temperature $T_{HW}$ exceeds the predetermined value $\alpha$, and otherwise to Step 1305.

If it is decided that the cooling water temperature $T_{HW}$ exceeds the predetermined value $\alpha$ so that the routine advances to Step 1302, the engine should be intrinsically in the lean combustion state. At Step 1302, however, it is decided whether or not the stoichiometry decide signal $E_{ctl}$ indicating whether or not the engine is in the lean combustion state is at "1" (that is, the lean combustion state has already prevailed if $E_{ctl}=1$). If the stoichiometry decide signal $E_{ctl}$ is at "1", the routine advances as it is to Step 1308. If it is decided at Step 1302 that the stoichiometry decide signal $E_{ctl}$ is at "0" (not "1", that is, not in the lean combustion state but in the stoichiometric combustion state), the air/fuel ratio switching condition is satisfied so that the routine advances to Step 1303, at which it is decided with the flag $F_2$ whether or not the automatic transmission A is changing its gears. If $F_2=1$, the automatic transmission A is changing its gears, and the air/fuel ratio is not switched (that is, the switching of the air/fuel ratio is inhibited), but the routine advances to Step 1308. If it is decided at Step 1302 that $F_2=0$, the gear change is not being executed, but a predetermined time has elapsed after the gear change. Hence, the stoichiometry decide signal $E_{ctl}$ is set (at Step 1304) to "1" so as to establish the lean combustion state, and the routine then advances to Step 1308.

If, on the other hand, it has been decided at preceding Step 1301 that the cooling water temperature $T_{HW}$ is lower than the predetermined value $\alpha$ so that the routine advances to Step 1305, the engine should intrinsically be in the stoichiometric combustion state. However, it is decided at Step 1305 in terms of the stoichiometry decide signal $E_{ctl}$ whether or not the engine has already been in the stoichiometric combustion state. If the stoichiometry decide signal $E_{ctl}$ is at "0", the stoichiometric combustion state has already prevailed. Therefore, the routine advances to Step 1308 without switching the air/fuel ratio.

If, on the other hand, it is decided at Step 1305 that the stoichiometry decide signal $E_{ctl}$ is at "1", the air/fuel ratio switching condition for switching the air/fuel ratio to the stoichiometric value is satisfied so that the routine advances to Step 1306. At Step 1306, it is decided whether or not the automatic transmission A is changing its gears (or whether or not a predetermined time period has elapsed after the gear change). If $F_2=1$ at Step 1306, the automatic transmission A is switching its gears. Hence, the air/fuel ratio is not switched (or the switching of the air/fuel ratio is inhibited), and the routine advances to Step 1308. If $F_2=0$ at Step 1306, the automatic transmission A is not changing its gears, but a predetermined time period has elapsed after the gear change. Hence, the stoichiometry decide signal $E_{ctl}$ is set to "0" (at Step 1307) to invite the stoichiometric combustion state, and the routine then advances to Step 1308.

At Step 1308, the air/fuel ratio is controlled in response to the stoichiometry decide signal $E_{ctl}$. Specifically, if the stoichiometry decide signal $E_{ctl}$ is at "1", the air/fuel ratio is controlled to the lean combustion state so that it may be higher than the stoichiometric value. If the stoichiometry decide signal $E_{ctl}$ is at "0", the air/fuel ratio is controlled to the stoichiometric value.

More specifically, in accordance with the value of the stoichiometry decide signal $E_{ctl}$ the basic injection rate set for the stoichiometric air/fuel ratio determined by the engine load and the engine revolution number is corrected to control the air/fuel ratio (for example, the basic injection rate is corrected to a lower value if $E_{ctl}=1$).

After this, the routine advances to Step 1309, at which it is decided from the flag $F_2$ whether or not the gears are being changed. If NOT (or if the flag $F_2$ is not at "1"), the routine is ended as it is.

If it is decided at Step 1309 that the gears are being changed or that the flag $F_2$ is at "1", the routine advances to Step 1310, at which it is decided from the value of the stoichiometry decide signal $E_{ctl}$ whether the engine is now in the stoichiometric combustion state or in the lean combustion state. If the stoichiometry decide signal $E_{ctl}$ is at "1", the lean combustion state prevails at present. Then, the routine advances to Step 1311, at which the torque-down (i.e., the ignition timing delay angle) $\delta_1$ at the shifting time in the lean combustion state is set to delay the ignition timing thereby to drop the engine torque.

If, on the other hand, it is decided at Step 1310 that the stoichiometry decide signal $E_{ctl}$ is at "0", the stoichiometric combustion state prevails at present. Then, the routine advances to Step 1312, at which the torque-down (i.e., the ignition timing delay angle) $\delta_2$ ($\delta_2 > \delta_1$) at the shifting time in the stoichiometric combustion state is set to delay the ignition timing accordingly thereby to drop the engine torque.

Incidentally, if the oil pressure per se of the automatic transmission A is so determined that it is premised to run in the lean combustion condition, the torque-down (i.e., the ignition timing delay angle) $\delta_1$ at the shifting time in the lean combustion state can be set to "0".

If the torque-down of the engine is determined, as at Steps 1310 to 1312, at the shifting time in accordance with the engine output characteristics of the shifting time, it is steadily possible to execute an excellent gear change having no shift shocks. However, for a period in which the gear change and the switching of the engine output characteristics overlap, it is difficult due to various causes to optimize the engine torque (i.e., to control the engine torque-down precisely). As in the present example, therefore, if the switching of the engine output characteristics (or the switching of the air/fuel ratio) is allowed at a predetermined time period after the end of the gear change (or other than during the shifting operation) but is inhibited during the shifting operation or within a predetermined period after the end of the gear change, then the shift shocks can be effectively prevented.

Incidentally, the foregoing embodiments are directed to the lean combustion engine equipped with the swirl control valve. Despite this description, however, the present invention can be applied to any control system for controlling both the engine having its output characteristics varied in plurality and the automatic transmission connected to the engine. Therefore, the present invention can be practiced for both the engine which is constructed to recirculate a lot of exhaust gases selectively to the intake passage and the automatic transmission connected to the engine.

In the present invention, moreover, the means for decreasing the engine torque should not be limited to that for delaying the ignition timing but may be exemplified by means for decreasing the fuel injection rate.

In the foregoing embodiments, still moreover, the change of the output characteristics of the engine is allowed after a predetermined time has elapsed after the end of the gear change. Despite this construction, however, according to the present invention, the output characteristics of the engine may be maintained at the preceding ones at least while the gears are being changed, and the output characteristics may be changed simultaneously with the end of the gear change.

Here will be synthetically described the advantages which can be obtained by the control system of the present invention. In case the engine is run for high output characteristics because of a low engine water temperature even if the throttle opening is small, the input torque to the automatic transmission in the shifting operation is suited for the oil pressure characteristics of the automatic transmission because the engine torque is dropped at the shifting time in accordance with the output characteristics based upon the engine water temperature. As a result, the shift shocks are improved, and the frictional engagement unit is prevented from excessively slipping to prevent any drop of the durability.

According to the control system of the present invention, it is possible to prevent any overlap among the gear change in the automatic transmission, the accordingly control of dropping the engine torque, and the control of changing the output characteristics of the engine. Thus, no mismatch occurs between the input torque to the automatic transmission and the engagement oil pressure so that the shift shocks can be improved. Furthermore, an excessive slippage of the frictional engagement unit can be prevented to improve the durability.

What is claimed is:

1. A control system for controlling both an engine capable of assuming a plurality of output characteristics having different output torques for a throttle opening and of dropping a selected output torque temporarily, and an automatic transmission connected to said engine, comprising:

first decide means for deciding on the basis of data inputted thereto, and independently of a gear change in the automatic transmission, that the output characteristics of said engine should be changed;

second decide means for deciding on the basis of input data thereto, including a vehicle speed and a throttle opening, that a gear change in the automatic transmission should be performed;

third decide means for deciding, when said second decide means decides that a gear change should be performed, that a torque-down is to be temporarily effected, the torque-down having a value determined according to the output characteristics of said engine decided by the first decide means; and means for reducing engine torque by said torque-down value.

2. A control system according to claim 1, wherein said first decide means includes determine means for determining lower output characteristics of said engine having a lower output torque when an engine water temperature is equal to or higher than a predetermined reference level, and for determining higher output characteristics having a higher output torque when the same temperature is lower than said reference level.

3. A control system according to claim 2, wherein said third decide means includes torque-down decide means for making the amount of torque-down for the case in which said determine means determines the higher output characteristics, larger than that for the case in which said determine means determines the lower output characteristics.

4. A control system according to claim 2, wherein said third decide means includes means for dropping the output torque of said engine temporarily by changing the ignition timing of said engine.

5. A control system according to claim 2, wherein said third decide means includes means for dropping the output torque of said engine temporarily by changing the injection rate of a fuel into said engine.

6. A control system according to claim 1, further comprising inhibit means for inhibiting any change in the output characteristics of said engine when said first device means decides the change in the output characteristics of said engine whereas said second decide means decides that a gear change should be performed and when said third decide means decides a temporary reduction of the output torque of said engine.

7. A control system according to claim 6, wherein said inhibit means includes means for inhibiting a change in the output characteristics of said engine for a predetermined time period after a shift has been decided.

8. A control system for controlling both an engine capable of assuming a plurality of output characteristics having different output torques for a throttle opening and of dropping a selected output torque temporarily, and an automatic transmission connected to said engine, comprising:

first decide means for deciding on the basis of data inputted thereto, and independently of gear change in the automatic transmission, that the output characteristics of said engine should be changed;

second decide means for deciding on the basis of input data thereto, including a vehicle speed and a throttle opening, that a gear change in the automatic transmission should be performed;

third decide means for deciding at a shifting time that the output of said engine should be dropped temporarily;

means for temporarily reducing engine torque in response to said third decide means; and inhibit means for inhibiting any change in the output characteristics of said engine, when said first decide means decides the change in the output characteristics of said engine and said second decide means decides that a gear change should be performed and when said third decide means decides a temporary reduction of the output torque of said engine.

* * * * *